US010785616B2

(12) United States Patent
Lewis et al.

(10) Patent No.: US 10,785,616 B2
(45) Date of Patent: Sep. 22, 2020

(54) SYSTEM AND METHOD FOR MANAGING INVENTORY VIA RFID TAGS

(71) Applicant: Walmart Apollo, LLC, Bentonville, AR (US)

(72) Inventors: Steven J. Lewis, Bentonville, AR (US); Jeremy R. Tingler, Bentonville, AR (US); Alvin S. Taulbee, Springdale, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

(21) Appl. No.: 16/040,848

(22) Filed: Jul. 20, 2018

(65) Prior Publication Data

US 2019/0028861 A1    Jan. 24, 2019

Related U.S. Application Data

(60) Provisional application No. 62/535,368, filed on Jul. 21, 2017.

(51) Int. Cl.
*G06K 17/00* (2006.01)
*H04W 4/35* (2018.01)
(Continued)

(52) U.S. Cl.
CPC .......... *H04W 4/35* (2018.02); *G06K 7/10445* (2013.01); *G06K 7/10475* (2013.01);
(Continued)

(58) Field of Classification Search
CPC ....................................................... H04W 4/35
See application file for complete search history.

(56) References Cited

U.S. PATENT DOCUMENTS 7,180,421 B2    2/2007   Pahlaven
7,859,411 B2   12/2010   Chakraborty
(Continued)

FOREIGN PATENT DOCUMENTS

JP       2015231155       12/2015

OTHER PUBLICATIONS

PCT; App. No. PCT/US18/42854; International Search Report and Written Opinion dated Sep. 26, 2018.

*Primary Examiner* — Joseph H Feild
*Assistant Examiner* — Pameshanand Mahase
(74) *Attorney, Agent, or Firm* — Fitch, Even, Tabin & Flannery LLP

(57) ABSTRACT

In some embodiments, apparatuses and methods are provided herein useful to monitoring RFID tags in a retail facility. In some embodiments, a system comprises an RFID tag, a first RFID reader monitoring a first zone and configured to determine, based on a signal received from the RFID tag, that the RFID tag is moving toward the second zone, transmit, to a second RFID reader monitoring the second zone, a notification indicating that the RFID tag is moving toward the second zone, and in response to receipt of a confirmation message from the second RFID reader, instruct the RFID tag to remain in its current state, and cease communication with the RFID tag, the second RFID reader configured to receive, from the first RFID reader, the notification, transmit, to the first RFID reader, the confirmation message, and transmit, to the RFID tag, a signal.

20 Claims, 3 Drawing Sheets

(51) Int. Cl.
  *H04W 4/029* (2018.01)
  *G06K 7/10* (2006.01)
  *G06Q 10/08* (2012.01)
  *H04W 4/80* (2018.01)
(52) U.S. Cl.
  CPC .......... *G06Q 10/087* (2013.01); *H04W 4/029* (2018.02); *H04W 4/80* (2018.02)

(56) References Cited

U.S. PATENT DOCUMENTS

| | | | |
|---|---|---|---|
| 8,107,446 B2 | 1/2012 | Shoarinejad | |
| 8,406,772 B2 | 3/2013 | Olson | |
| 8,537,014 B2 | 9/2013 | Broer | |
| 2003/0052161 A1 | 3/2003 | Rakers | |
| 2004/0134984 A1* | 7/2004 | Powell | G06K 7/0008 235/451 |
| 2005/0088284 A1 | 4/2005 | Zai | |
| 2006/0022800 A1* | 2/2006 | Krishna | G06K 7/0008 340/10.2 |
| 2006/0022815 A1* | 2/2006 | Fischer | G06K 7/0008 340/505 |
| 2007/0164109 A1 | 7/2007 | Ridings | |
| 2008/0160984 A1* | 7/2008 | Benes | H04M 1/7253 455/419 |
| 2009/0273450 A1* | 11/2009 | Moran | G06K 19/07336 340/10.4 |
| 2010/0148931 A1* | 6/2010 | Pappu | G06K 7/0008 340/10.2 |
| 2013/0021142 A1* | 1/2013 | Matsui | G06K 7/10079 340/10.51 |
| 2014/0266617 A1 | 9/2014 | Wilkinson | |
| 2015/0379860 A1 | 12/2015 | Vardi | |
| 2016/0055360 A1* | 2/2016 | Haugarth | G06Q 30/0201 340/10.1 |

* cited by examiner

SYSTEM AND METHOD FOR MANAGING INVENTORY VIA RFID TAGS

CROSS-REFERENCE TO RELATED APPLICATION

This application claims the benefit of U.S. Provisional Application No. 62/535,368, filed Jul. 21, 2017, which is incorporated by reference in its entirety herein.

TECHNICAL FIELD

This invention relates generally to inventory management and, more particularly, to inventory management techniques using radio frequency identification (RFID) technology.

BACKGROUND

Many stores and businesses use radio frequency identification (RFID) technology for inventory management purposes. For example, products in a warehouse or retail facility can include RFID tags. RFID readers are used to read the RFID tags and keep track of the products on a shelf, in a stockroom, on a sales floor, etc. While the current use of RFID technology is useful in inventory management, it does have some drawbacks. For example, once an RFID tag is energized, the RFID reader reading the RFID tag will instruct the RFID tag to transition to a new state. The RFID reader will then remain in this new state for a predefined period of time. The RFID tag transfers to this state after being instructed to do so by the RFID reader that has read the RFID tag. After the predefined period of time, the RFID tag reverts back to the original state.

Oftentimes, after being read, the RFID tag will transition to a state in which it will not be read (i.e., a state in which it will not be energized by RFID readers). That is, the RFID tag enters a state in which it will not be read until the predefined period of time has lapsed. While this reduces the likelihood of multiple reads of the same tag during an inventory period, it presents a difficulty if the goal is to read the tag twice, for example, by two distinct RFID readers. That is, if, after being read, the RFID tag enters a state in which it will not be read for the predefined period of time, a subsequent scan conducted during the predetermined period of time will not read the RFID tag. Consequently, while the state-switching aspect of RFID tags is beneficial in some circumstances (e.g., preventing duplicative reads), it can be a hindrance in others (e.g., subsequent reads in relatively quick succession).

BRIEF DESCRIPTION OF THE DRAWINGS

Disclosed herein are embodiments of systems, apparatuses and methods pertaining to monitoring RFID tags in a retail facility. This description includes drawings, wherein.

Figure 1:
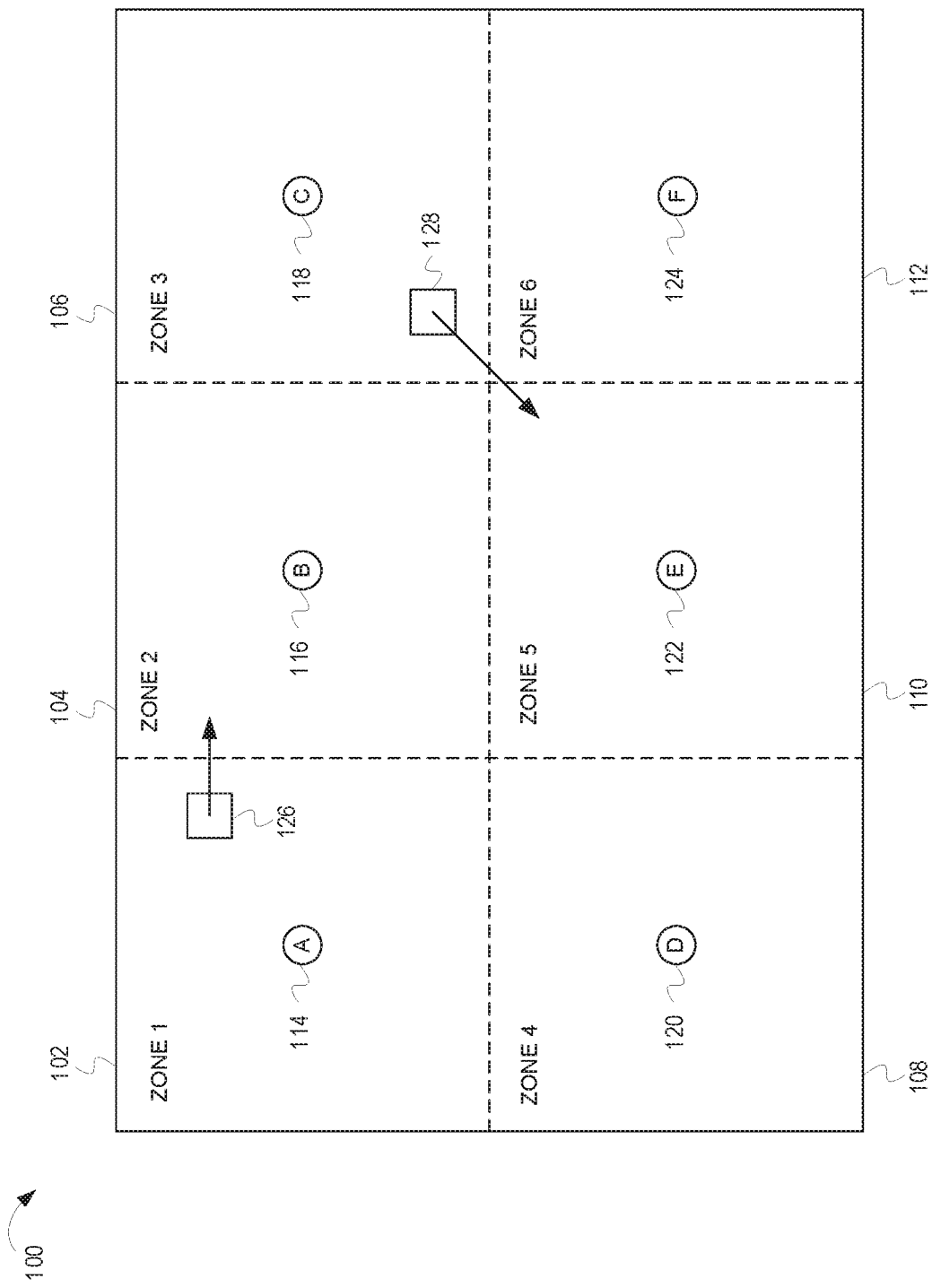
FIG. 1 depicts a retail facility 100 including a plurality of zones, each zone including an RFID reader, according to some embodiments.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, pursuant to various embodiments, systems, apparatuses, and methods are provided herein useful to monitoring RFID tags in a retail facility. In some embodiments, a system for monitoring RFID tags in a retail facility comprises an RFID tag, a first RFID reader monitoring a first zone and configured to determine, based on a signal received from the RFID tag, that the RFID tag is moving toward the second zone, transmit, to a second RFID reader monitoring the second zone, a notification indicating that the RFID tag is moving toward the second zone, and in response to receipt of a confirmation message from the second RFID reader, instruct the RFID tag to remain in its current state, and cease communication with the RFID tag, the second RFID reader configured to receive, from the first RFID reader, the notification indicating that the RFID tag is moving toward the second zone, transmit, to the first RFID reader, the confirmation message, and transmit, to the RFID tag, a signal.

When an RFID reader reads an RFID tag, the RFID reader energizes the RFID tag. As previously discussed, after the RFID tag is read by the RFID reader, the RFID reader reading the RFID tag instructs the RFID tag to enter a new state. While in this new state the RFID tag cannot be energized, and thus cannot be read, by other RFID readers. While this is beneficial in preventing duplicative reads, it can be detrimental if the goal is to read the RFID tag by multiple RFID readers in quick succession. One instance where reading RFID tags in quick succession is at RFID readers near exits of a structure, such as a retail facility (i.e., by "exit readers"). While an RFID tag is in the retail facility, it has many opportunities to be read. For example, the RFID tag could be read in the stockroom, when the RFID tag is transferred from the stockroom to the sales floor, during an automated or manual read while on the sales floor, etc. Consequently, if an RFID tag is missed during a read, there are many opportunities for the missed RFID tag to be read while that RFID tag is still within the retail facility. However, once the RFID tag has left the retail facility, it is unlikely that the RFID tag will be read again. Consequently, if the exit readers miss or otherwise fail to read the RFID tag as it exits the retail facility, uncertainty will exist as to whether the RFID tag is still within the retail facility.

Embodiments of the inventive subject matter include systems, methods, and apparatuses which seek to eliminate, or at least reduce, the occurrence of missed RFID reads. In some embodiments, such a system includes a plurality of RFID readers. Each of the RFID readers monitors a different zone and RFID tags within their respective zones. For example, assume a first RFID readers monitors a first zone and a second RFID reader monitors a second zone. If an RFID tag in the first zone is moving toward the boundary of the first zone and second zone, the first RFID reader hands the RFID tag off to the second RFID reader and instructs the RFID tag to remain in its current, energized state. Because the RFID tag remains in its current state, the RFID tag does not transition to a state in which it is not read, reducing the risk that the second RFID reader will miss reading the RFID tag. FIG. 1 and the related text provide additional detail regarding such systems, methods, and apparatuses.

FIG. 1 depicts a retail facility 100 including a plurality of zones, each zone including an RFID reader, according to some embodiments. Specifically, the example retail facility 100 depicted in FIG. 1 includes six zones: a first zone 102, a second zone 104, a third zone 106, a fourth zone 108, a fifth zone 110, and a sixth zone 112. Each of the six zones has an associated RFID reader. A depicted in FIG. 1, RFID Reader A 114 is associated with the first zone 102, RFID reader B 116 is associated with the second zone 104, RFID reader C 118 is associated with the third zone 106, RFID Reader D 120 is associated with the fourth zone 108, RFID Reader E is associated with the fifth zone 110, and RFID Reader F 124 is associated with the sixth zone 112. Each of the RFID readers monitors RFID tags in its respective zone. For example, RFID Reader A 114 monitors the first zone 102 and RFID Reader E 122 monitors the fifth zone 110. Although FIG. 1 depicts the zones as non-overlapping and rectangular, this is not required. Rather, the RFID readers can be placed in any suitable arrangement regardless of the positioning of the zones and shape of the zones.

The RFID readers communicate with one another. In some embodiments, the RFID readers are part of a traditional network and communicate with one another via a backend server (e.g., a control circuit). In other embodiments, the RFID readers communicate directly with one another, for example, as a mesh network. In either case, the communications between RFID readers can occur via any suitable wired or wireless means. The RFID readers communicate with one another to transmit notifications indicating that an RFID tag is moving toward another RFID reader's zone. For example, a first RFID tag 126 is located in the first zone 102 and moving toward the second zone 104. RFID Reader A 114 can detect this motion, determine that the first RFID tag 126 is moving toward the second zone 104, determine that RFID Reader B 116 is associated with the second zone 104, and transmit a notification to RFID Reader B 116 indicating that the first RFID tag 126 is moving toward the second zone 104. The RFID readers can detect movement of the RFID tags via any suitable means. In one embodiment, the RFID readers determine movement of the RFID tags based on received signal strength indicators (RSSI) values. For example, if the RSSI value of the signal transmitted from the first RFID tag 126 to RFID reader A 114 is decreasing, RFID reader A 114 can determine that the first RFID tag 126 is moving away from RFID Reader A 114. Additionally, in some embodiments, the RFID readers can determine movement, the direction of the movement, and/or the magnitude of the movement using RSSI values, approach angles, velocities, and read rates of RFID tags.

As previously discussed, when an RFID tag is moving toward another RFID reader's zone, the RFID readers communicate with one another to hand the RFID tag off between RFID readers. For example, as the first RFID tag 126 moves toward the second zone 104, RFID Reader A 114 can send a notification to RFID Reader B 116. The notification can include an identification of the first RFID tag 126, a frequency over which the first RFID tag 126 communicates, a read history of the first RFID tag 126, an identifier of RFID Reader A 114 and/or RFID Reader B, identifiers of the first zone 102 and/or the second zone 104, and/or another suitable information. The receiving RFID reader (i.e., RFID reader B 116 in this example), can use this information to begin communicating with the RFID tag (i.e., the first RFID tag 126 in this example).

After an RFID reader receives a notification indicating that an RFID tag is moving toward its zone, the RFID reader can transmit a confirmation message back to the original RFID reader. Continuing the example discussed above, upon receipt of the notification, RFID Reader B 116 transmits a confirmation message back to RFID Reader A 114. The confirmation message notifies the original RFID reader that the notification has been received and that the original RFID reader can cease communication with the RFID tag.

After the original RFID reader receives the communication, the original RFID reader instructs the RFID tag to remain in its current state. In the example discussed above, RFID Reader A 114 instructs the first RFID tag 126 to remain in its current state. When the RFID tag remains in its current state, the RFID tag can remain capable of communicating with RFID readers. Because the RFID tag remains capable of communicating with RFID readers, it can be passed off to the next RFID reader without being missed. For example, in typical systems, after being read by RFID Reader A 114, the first RFID tag 126 would switch to a state in which it would not be read. If RFID Reader B 116 were an exit reader and the first RFID tag 126 left the retail facility 100 before it switched back to a state in which it could be read, RFID Reader B may miss reading the first RFID tag 126 and it would not be known that the first RFID tag 126 left the retail facility 100. However, with the system described herein, the first RFID tag 126 is instructed to remain in its current state so that RFID Reader B 116 can read the first RFID tag 126 shortly, if not immediately, after the first RFID tag 126 is within its range. Accordingly, RFID Reader B 116 can read the first RFID tag 126 with little, if any, delay from the time that RFID Reader A 114 ceases communication with the first RFID tag 126.

In addition to instructing the RFID tag to remain in its current state, after receiving the confirmation message the original RFID reader ceases communication with the RFID tag. In the example described above, after receiving the confirmation message from RFID Reader B 116, RFID Reader A 114 ceases communication with the first RFID tag 126. As one example, RFID Reader A 114 ceases communication with the first RFID tag 126 by blacklisting, or otherwise blocking transmissions from, the first RFID tag 126. In some embodiments, RFID reader A 114 can blacklist, or otherwise block communications from, the first RFID tag 126 for a predetermined period of time. Such embodiments allow RFID Reader A 114 to reestablish communication with the first RFID tag 126 should the first RFID tag 126 reenter the first zone 102.

After the original RFID reader has ceased communications with the RFID tag, the new RFID reader (i.e., the RFID reader into whose zone the RFID tag has entered) can begin communication with the RFID tag. In the example discussed above, once RFID Reader A 114 ceases communication with the first RFID tag 126, RFID Reader B 116 can begin communication with the first RFID tag 126. For example, RFID Reader B 116 can begin communication with the first RFID tag 126 by transmitting a signal to the first RFID tag 126. In some embodiments, exit readers can perform functions similar to those described above with respect to receiving communications from other RFID readers and transmitting signals to RFID tags, but behave differently with regard to instructing the RFID tag to switch states. For example, once an exit reader has read and RFID tag, the exit reader can instruct the RFID tag to switch states so that the RFID tag will no longer be read, either for a period of time or indefinitely.

While the example discussed above describes an RFID tag (i.e., the first RFID tag 126) moving between adjacent zone (i.e., the first zone 102 and the second zone 104), in some embodiments, the RFID readers may be able to "skip" one or more zones dependent upon the trajectory of the RFID tag and the positioning of the zones. For example, assume a second RFID tag 128 is moving from the third zone 106 to the fifth zone 110, while briefly passing through the sixth zone 112. In such embodiments, RFID Reader C 118, RFID Reader F 124, and/or RFID Reader E 122 can analyze the trajectory of the second RFID tag 128 and determine, if appropriate, that the second RFID tag 128 should be handed off directly from RFID Reader C 118 to RFID Reader E 122, effectively "skipping" RFID Reader F 124.

Figure 2:
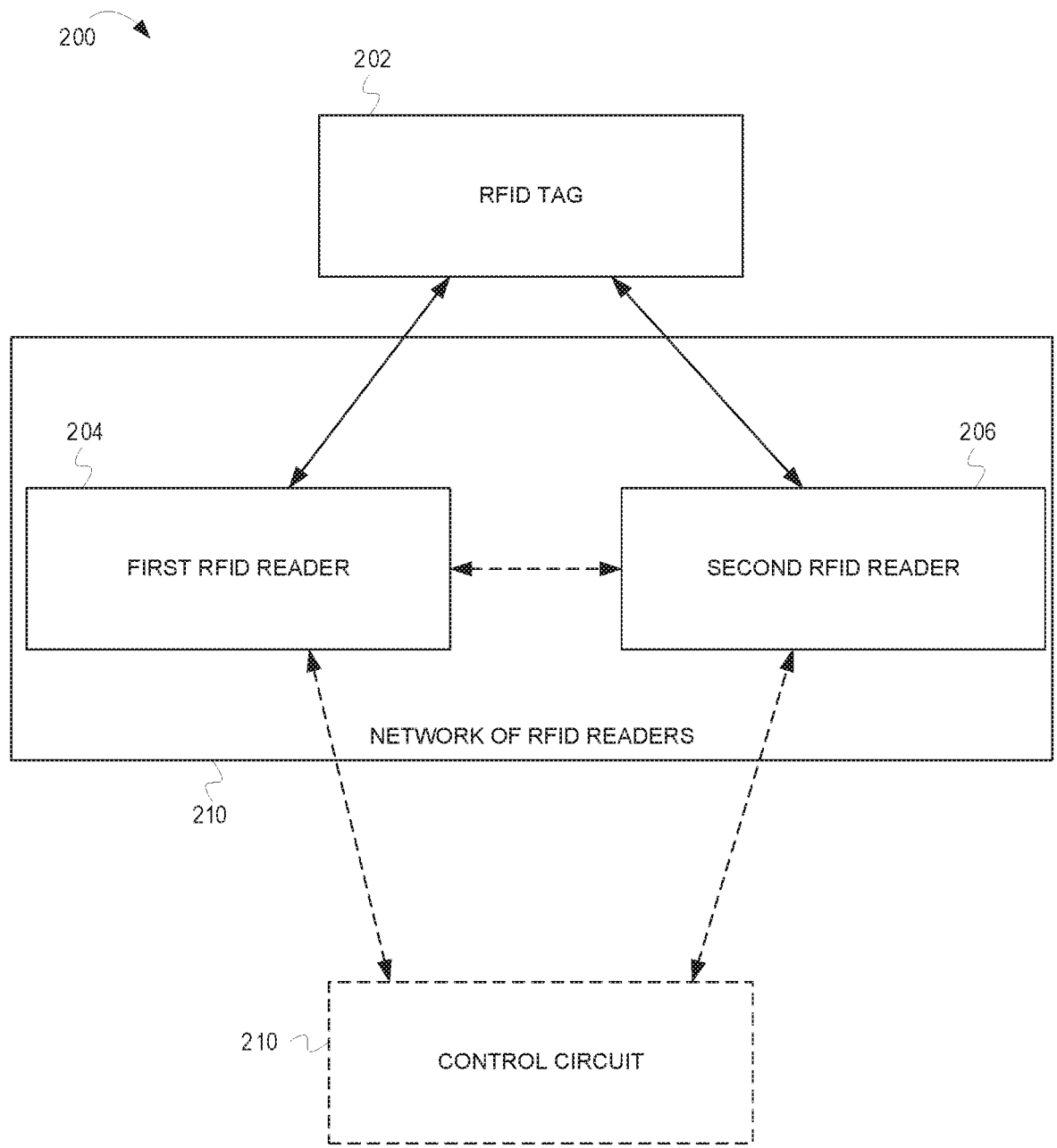
FIG. 2 is a block diagram depicting a system 200 for monitoring RFID tags in a retail facility, according to some embodiments.

While the discussion of FIG. 1 provides an overview of monitoring and handing off RFID tags, the discussion of FIG. 2 provides additional detail about systems for monitoring and handing off RFID tags.

FIG. 2 is a block diagram depicting a system 200 for monitoring RFID tags in a retail facility, according to some embodiments. The system 200 includes an RFID tag 202, a first RFID reader 204, and a second RFID reader 206. Additionally, in some embodiments, as will be discussed in greater detail, the system 200 also includes a control circuit 210.

The first RFID reader 204 and the second RFID reader 206 are part of a network of RFID readers 208. The network of RFID readers 208 can include any suitable number, and type, of RFID readers. The network of RFID readers 208 is used to monitor RFID tags. For example, the RFID tags can be affixed to, or incorporated with, products and the network of RFID readers 208 can be used for inventory management purposes. When used for inventory management purposes, the network of RFID readers 208 can span a sales floor, a stockroom, and/or a staging area. Each RFID reader in the network of RFID readers 208 monitors a different zone. For example, the first RFID reader 204 can monitor RFID tags in a first zone and the second RFID reader can monitor RFID tags in a second zone.

As the RFID tag 202 moves about the monitored area, they move from zone to zone. For example, when the RFID tag 202 is in the first zone it can be read by the first RFID reader 204 and when the RFID tag 202 is in the second zone, it can be read by the second RFID reader 206. As the RFID tag 202 passes from zone to zone, the RFID readers associated with each zone hand the RFID tag 202 off to one another. For example, when the RFID tag 202 moves from the first zone to the second zone, the first RFID reader 204 can hand the RFID tag 202 off to the second RFID reader 206. The handoff of the RFID tag 202 between RFID readers can prevent missed reads of the RFID tag 202 by minimizing, if not eliminating, latency between the reads caused by state-switching of the RFID tag 202.

This handoff can include the passing of communications between the RFID readers. For example, the first RFID reader 204 can notify the second RFID reader 206 that the RFID tag 202 is moving toward the second zone. Additionally, this notification can include information about the RFID tag 212, the network of RFID readers 208, previous reads of the RFID tag 202, etc. After the second RFID reader 206 receives the notification, the second RFID reader 206 can transmit a confirmation to the first RFID reader 204 indicating that the notification was received. After the confirmation is received, the first RFID reader 204 instructs the RFID tag to remain in its current state so that the second RFID reader 206 can read the RFID tag 202 as soon as the RFID tag 202 is within range of the second RFID reader 206.

In some embodiments, the RFID readers in the network of RFID readers 208 communicate directly with each other. In such embodiments, one or more of the RFID readers may be aware of some or all of the locations of the other RFID readers in the network of RFID readers 208. Consequently, the RFID readers may be able to determine toward which zone, and ultimately RFID reader, the RFID tag 202 is travelling.

In other embodiments, the RFID readers in the network of RFID readers 208 communicates with the control circuit 210. The control circuit 210 can comprise a fixed-purpose hard-wired hardware platform (including but not limited to an application-specific integrated circuit (ASIC) (which is an integrated circuit that is customized by design for a particular use, rather than intended for general-purpose use), a field-programmable gate array (FPGA), and the like) or can comprise a partially or wholly-programmable hardware platform (including but not limited to microcontrollers, microprocessors, and the like). These architectural options for such structures are well known and understood in the art and require no further description here. The control circuit 210 is configured (for example, by using corresponding programming as will be well understood by those skilled in the art) to carry out one or more of the steps, actions, and/or functions described herein.

By one optional approach the control circuit 210 operably couples to a memory. The memory may be integral to the control circuit 210 or can be physically discrete (in whole or in part) from the control circuit 210 as desired. This memory can also be local with respect to the control circuit 210 (where, for example, both share a common circuit board, chassis, power supply, and/or housing) or can be partially or wholly remote with respect to the control circuit 210 (where, for example, the memory is physically located in another facility, metropolitan area, or even country as compared to the control circuit 210).

This memory can serve, for example, to non-transitorily store the computer instructions that, when executed by the control circuit 210, cause the control circuit 210 to behave as described herein. As used herein, this reference to "non-transitorily" will be understood to refer to a non-ephemeral state for the stored contents (and hence excludes when the stored contents merely constitute signals or waves) rather than volatility of the storage media itself and hence includes both non-volatile memory (such as read-only memory (ROM) as well as volatile memory (such as an erasable programmable read-only memory (EPROM).

In such embodiments, the RFID readers may not communicate directly with one another, but rather communicate with each other via the control circuit 210. When communicating via the control circuit 210, the control circuit can determine toward which zone, and ultimately RFID reader, the RFID tag 202 is travelling. The control circuit 210 makes this determination based on information received from the RFID readers, such as reads, RSSI values, locations, identifiers, etc.

Figure 3:
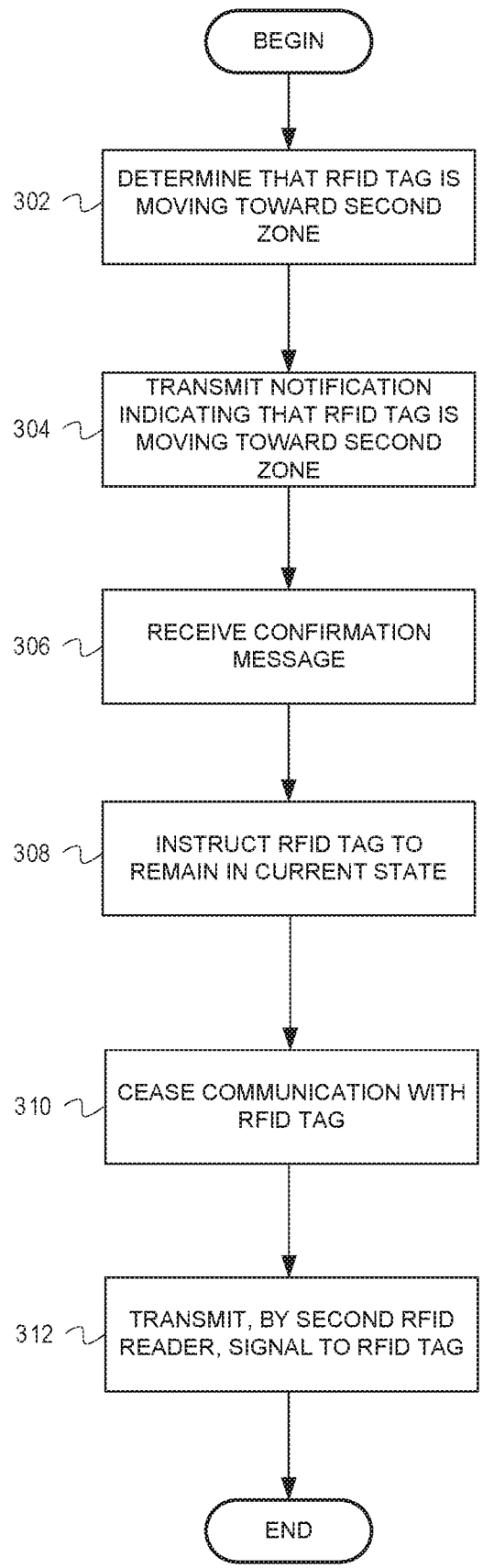
FIG. 3 is a flow chart depicting example operations for monitoring RFID tags in a retail facility, according to some embodiments.

While the discussion of FIG. 2 provides additional detail about systems for monitoring and handing off RFID tags, the discussion of FIG. 3 provides example operations for monitoring and handing off RFID tags.

FIG. 3 is a flow chart depicting example operations for monitoring RFID tags in a retail facility, according to some embodiments. The flow begins at block 302.

At block 302, it is determined that an RFID tag is moving toward a second zone. For example, a first RFID reader can determine that the RFID tag is moving toward a second zone. Alternatively, a control circuit can determine that the RFID tag is moving toward the second zone. Regardless of which device makes the determination, the determination can be based on RSSI values, approach angles, velocities, read rates of RFID tags, and/or any other suitable value. For example, the first RFID reader can determine that the RSSI value for the RFID tag is decreasing. At the same time, a second RFID (monitoring the second zone) reader may determine that the RSSI values for the RFID tag are increasing. Based on this information, the first RFID reader can determine that the RFID tag is moving toward the second zone. Alternatively, or additionally, the first RFID reader (or control circuit) can receive information (e.g., RSSI values, read data, etc.) from other RFID readers in the network of RFID readers. Based on the information, the first RFID reader (or control circuit) can determine the location of the RFID tag based on triangulation. In such embodiments, the first RFID reader (or control circuit) can determine that the RFID tag is moving toward the second zone based on triangulation. Additionally, the determination of the zone (i.e., the second zone) can be based on known locations of different zones. The flow continues at block 304.

At block 304, a notification indicating that the RFID tag is moving toward the second zone is transmitted. For example, the first RFID reader, or in appropriate cases the control circuit, can transmit the notification indication that the RFID tag is moving toward the second zone to a second RFID reader associated with the second zone. Regardless of which device transmits the notification, the device can determine to which RFID reader to transmit the notification based on an association between zones and RFID readers. For example, the associations can be determined based on a table or other data structure. The notification can include information about the RFID tag, the network of RFID readers, previous reads of the RFID tag, etc. The flow continues at block 306.

At block 306, a confirmation message is received. For example, the first RFID tag, or the control circuit, can receive the confirmation message from the second RFID reader. The confirmation message acknowledges that the notification has been received. Further, in some embodiments, the confirmation message triggers action to be performed by the first RFID reader or the control circuit. The flow continues at block 308.

At block 308, the RFID tag is instructed to remain in its current state. For example, the first RFID reader, or the control circuit, instructs the RFID tag to remain in its current state. Because the first RFID reader, or the control circuit, is currently in communication with the RFID tag, the RFID tag is in a state in which it can be read. My instructing the RFID tag to remain in its current state, a subsequent RFID reader can read the RFID tag with little, if any, latency between the first RFID reader reading the RFID tag and the subsequent RFID reader reading the RFID tag. The flow continues at block 310.

At block 310, communication is ceased with the RFID tag. For example, the first RFID reader, or the control circuit, can cease communication with the RFID tag. The flow continues at block 312.

At block 312, a signal is transmitted to the RFID tag. For example, the second RFID reader can transmit the signal to the RFID tag. The signal can be used to read and/or energize the RFID tag and/or read the RFID tag.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

Generally speaking, pursuant to various embodiments, systems, apparatuses, and methods are provided herein useful to monitoring RFID tags in a retail facility. In some embodiments, a system for monitoring RFID tags in a retail facility comprises an RFID tag, a first RFID reader monitoring a first zone and configured to determine, based on a signal received from the RFID tag, that the RFID tag is moving toward the second zone, transmit, to a second RFID reader monitoring the second zone, a notification indicating that the RFID tag is moving toward the second zone, and in response to receipt of a confirmation message from the second RFID reader, instruct the RFID tag to remain in its current state, and cease communication with the RFID tag, the second RFID reader configured to receive, from the first RFID reader, the notification indicating that the RFID tag is moving toward the second zone, transmit, to the first RFID reader, the confirmation message, and transmit, to the RFID tag, a signal.

In some embodiments, an apparatus, and a corresponding method performed by the apparatus, comprises determining, by a first RFID reader based on a signal received from an RFID tag, that the RFID tag is moving toward a second zone, transmitting, to a second RFID reader monitoring the second zone, a notification indicating that the RFID tag is moving toward the second zone, receiving, by the first RFID reader, a confirmation message, instructing, by the first RFID reader, the RFID tag to remain in its current state, ceasing, by the first RFID reader, communication with the RFID tag, and transmitting, by the second RFID reader, a signal to the RFID tag.

What is claimed is:

1. A system for monitoring radio frequency identification (RFID) tags in a retail facility, the system comprising:
   an RFID tag;
   a first RFID reader monitoring a first zone, wherein the first RFID reader is configured to:
      determine, while reading the RFID tag based on a signal received from the RFID tag, a direction of movement of the RFID tag;
      determine, based on the direction of movement of the RFID tag, that the RFID tag is moving toward a second zone;
      determine that a second RFID reader is monitoring the second zone;
      transmit, to the second RFID reader, a notification indicating that the RFID tag is moving toward the second zone;
      in response to receipt of a confirmation message from the second RFID reader, instruct the RFID tag to remain in its current state; and
      cease communication with the RFID tag;
   the second RFID reader, wherein the second RFID reader is configured to:
      receive, from the first RFID reader, the notification indicating that the RFID tag is moving toward the second zone;

transmit, to the first RFID reader, the confirmation message; and
transmit, to the RFID tag, a signal.

2. The system of claim 1, wherein the current state is a state in which the RFID tag can be read by RFID readers.

3. The system of claim 1, wherein the first RFID reader determines that the RFID tag is moving toward the second zone based on one or more of a received signal strength indicator (RSSI) value, a velocity, an approach angle, and a read rate.

4. The system of claim 1, wherein the notification indicating that the RFID tag is moving toward the second zone includes one or more of an identification for the RFID tag, a frequency over which the RFID tag communicates, and a read history for the RFID tag.

5. The system of claim 1, wherein the first RFID reader ceases communication with the RFID tag by blocking transmissions from the RFID tag.

6. The system of claim 5, wherein the first RFID reader only blocks transmissions from the RFID tag for a predetermined time period.

7. The system of claim 1, wherein the first RFID reader is further configured to:
transmit, to a third RFID reader, an instruction to block transmissions from the RFID tag.

8. The system of claim 1, wherein the confirmation message indicates that the second RFID reader has established communication with the RFID tag.

9. The system of claim 1, wherein the second RFID reader is further configured to:
transmit, to the RFID tag, an instruction to change to a new state, wherein the new state is a state in which the RFID tag cannot be read by RFID readers for at least a period of time.

10. A method for monitoring radio frequency identification (RFID) tags in a retail facility, the method comprising:
determining, by a first RFID reader while the first RFID reader is reading an RFID tag based on a signal received from the RFID tag, a direction of movement of the RFID tag;
determining, based on the direction of movement of the RFID tag, that the RFID tag is moving toward a second zone;
determining that a second RFID reader is monitoring the second zone;
transmitting, to the second RFID reader, a notification indicating that the RFID tag is moving toward the second zone;

receiving, by the first RFID reader, a confirmation message;
instructing, by the first RFID reader, the RFID tag to remain in its current state;
ceasing, by the first RFID reader, communication with the RFID tag; and
transmitting, by the second RFID reader, a signal to the RFID tag.

11. The method of claim 10, wherein the current state is a state in which the RFID tag can be read by RFID readers.

12. The method of claim 10, wherein the first RFID reader determines that the RFID tag is moving toward the second zone based on one or more of a received signal strength indicator (RSSI) value, a velocity, an approach angle, and a read rate.

13. The method of claim 10, wherein the notification indicating that the RFID tag is moving toward the second zone includes one or more of an identification for the RFID tag, a frequency over which the RFID tag communicates, and a read history for the RFID tag.

14. The method of claim 10, wherein the first RFID reader ceases communication with the RFID tag by blocking transmissions from the RFID tag.

15. The method of claim 14, wherein the first RFID reader only blocks transmissions from the RFID tag for a predetermined time period.

16. The method of claim 10, further comprising:
transmitting, by the first RFID reader to a third RFID reader, an instruction to block transmissions from the RFID tag.

17. The method of claim 10, wherein the confirmation message indicates that the second RFID reader has established communication with the RFID tag.

18. The method of claim 10, further comprising:
transmitting, by the second RFID reader to the RFID tag, an instruction to change to a new state, wherein the new state is a state in which the RFID tag cannot be read by RFID readers for at least a period of time.

19. The system of claim 1, wherein the first RFID reader transmits the notification indicating that the RFID tag is moving toward the second zone to the second RFID reader to hand the RFID tag off to the second RFID reader.

20. The method of claim 10, wherein the first RFID reader transmits the notification indicating that the RFID tag is moving toward the second zone to the second RFID reader to hand the RFID tag off to the second RFID reader.

* * * * *